Nov. 9, 1971    H. BIERLEIN    3,618,384
BELT SPLICE FOR V-PULLEY DRIVE
Filed Feb. 5, 1970    2 Sheets-Sheet 1

INVENTOR.
HARRY BIERLEIN
BY
Hood Gust Irish & Lundy
ATTORNEYS

Nov. 9, 1971  H. BIERLEIN  3,618,384
BELT SPLICE FOR V-PULLEY DRIVE
Filed Feb. 5, 1970  2 Sheets-Sheet 2

INVENTOR.
HARRY BIERLEIN
BY
Hood Gust Irish & Lundy
ATTORNEYS

United States Patent Office 3,618,384
Patented Nov. 9, 1971

3,618,384
BELT SPLICE FOR V-PULLEY DRIVE
Harry Bierlein, Edinburg, Ind., assignor to Reliance
Electric Company, Cleveland, Ohio
Filed Feb. 5, 1970, Ser. No. 8,920
Int. Cl. F16g 5/00, 13/02
U.S. Cl. 74—234        6 Claims

ABSTRACT OF THE DISCLOSURE

A splice for a longitudinally- and transversely-flexible belt body for use with a V-pulley power transmission device in which the belt must be transversely stiffened, the splice consisting of four identical splice plates of rectangular cross-section rivetted, in registering pairs, to the opposite surfaces of the opposite end regions of the belt body, a pair of splice blocks, each formed with a cavity to receive the splice plates on one surface of the belt, and a plurality of headed screws penetrating one of said blocks and threadedly engaging the other to clamp the blocks to the belt with the splice plates confined within the block cavities.

---

The present invention relates to a belt splice for a V-pulley drive and is particularly concerned with that type of belt which comprises a longitudinally- and transversely-flexible belt body which is transversely stiffened by means of a multiplicity of transversely-extending, rigid blocks which sustain the driving pressure between the belt and the facing surfaces of a V-pulley. Such belts have long been used primarily between the expansible V-pulleys of speed-varying drives; and for more than seventy years (see Pat. 581,770) the search for the perfect splice for use in such a belt has gone on. Among the requirements for the perfect splice are the maintenance of transverse rigidity within the splice without significant loss of longitudinal flexibility, minimization of friction within the splice and thus minimization of relative movement among the components of the splice, avoidance of longitudinal play or lost motion among the elements of the splice, maintenance of longitudinal tension within the splice to correspond to that within the body of the belt, simplicity of structure resulting in low cost, and ease or facility of assembly and disassembly.

In the past, the many forms of belt splice which have been proposed and which have been commercially used in such belts have possessed some of the desirable characteristics, but have always been deficient in one way or another.

The splice disclosed and claimed herein meets, to an improved degree, all of the requirements of a perfect splice. Briefly stated, then, it is the primary object of the present invention to provide, for use in a belt of the character described, a splice having structural and functional advantages over any splice heretofore known. More particularly, it is an object of the present invention to provide, for use in such a belt, a splice structure which is simpler, less expensive, more easily assembled and disassembled and more efficient in performing its intended functions than any splice heretofore known.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
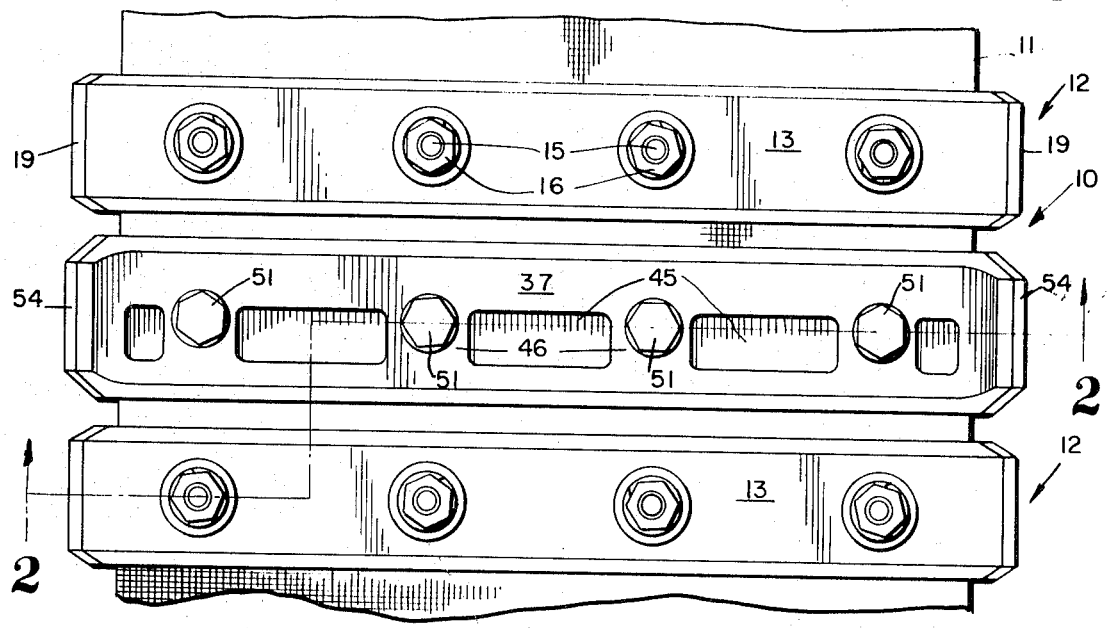
FIG. 1 is a plan view of the splice region of a belt constructed in accordance with the present invention, illustrating an outer splice block located between two conventional stiffener blocks.
Figure 2:
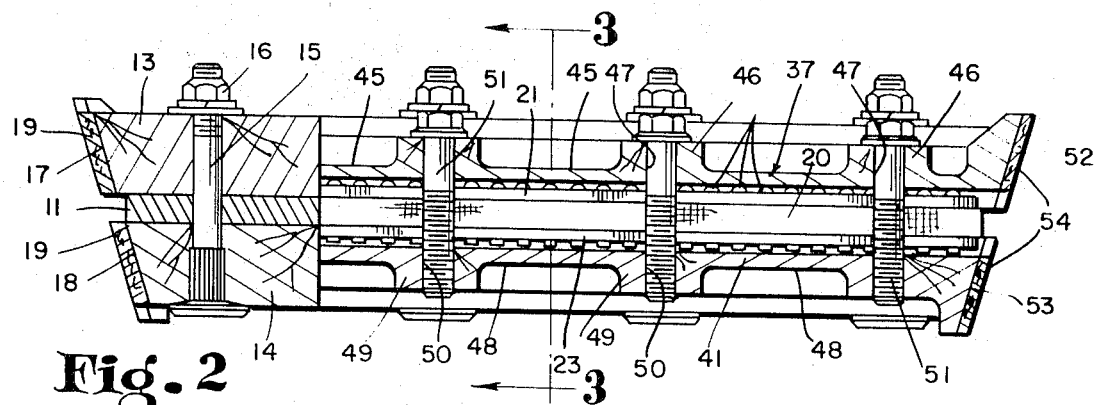
FIG. 2 is a section taken substantially on the line 2—2 of FIG. 1.
Figure 3:
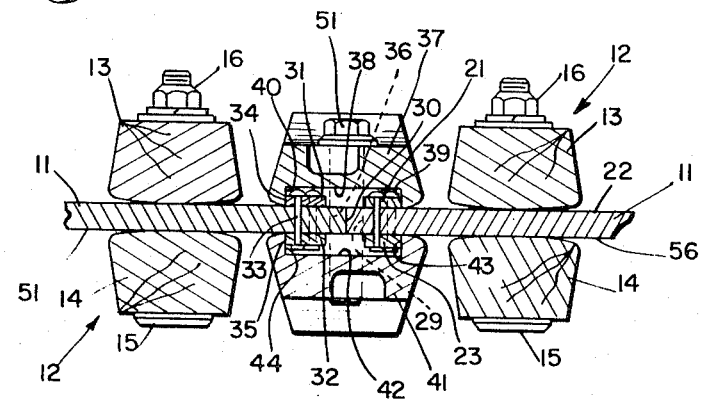
FIG. 3 is a section taken substantially on the line 3—3 of FIG. 2.

Referring more particularly to the drawings, the reference numeral 10 indicates generally a belt comprising a longitudinally- and transversely-flexible body 11, transversely stiffened by a multiplicity of transversely extending stiffener blocks, indicated generally by the reference numeral 12, suitably secured to the belt body at closely longitudinally-spaced intervals. As is more clearly illustrated in FIG. 3, each stiffener block 12 comprises an upper block 13 and a lower block 14 disposed upon opposite surfaces of the belt body 11 and clamped together and to the belt body by means of a plurality of headed bolts 15 passing through both blocks and the belt, each bolt head bearing upon the inner surface of its inner block 14 and receiving, on its outer end, a nut 16, suitable washers or shims being provided for accomplishing the clamping purpose. Customarily, the blocks 12 are made of wood and are shaped, at their opposite ends, to provide outwardly inclined surfaces 17 and 18, the surfaces 17 and 18 at each end of the assembly lying in a common plane; and customarily, friction pads 19 are secured to said inclined surfaces 17 and 18. All of the above is conventional construction.

Figure 4:
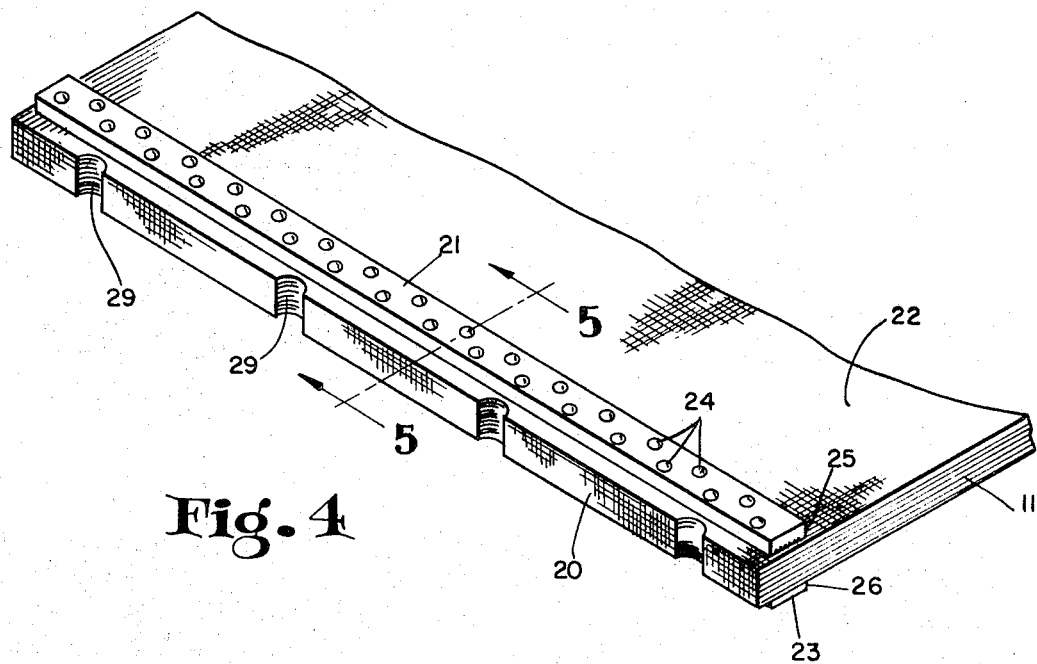
FIG. 4 is a fragmentary perspective of one end region of a belt body carrying the splice plate which constitute an element of the present invention.

According to the present invention, a splice plate 21 of substantially rectangular cross section and preferably having a length substantially equal to the width of the belt body 11 is secured to the outer surface 22 of the belt body at a point slightly proximally displaced from one end 20 of the belt body; and a substantially identical splice plate 23 is located in registry with the plate 21 but in contact with the inner surface 56 of the belt. The plates 21 and 23 are firmly secured to the belt body, as by rivets 24, preferably arranged in two vows in staggered relation, as most clearly illustrated in FIG. 4. The plate 21 thus presents a proximally-facing abutment surface 25 and the plate 23 presents a similar surface 26, the surfaces 25 and 26 being preferably disposed substantially in a common plane perpendicular to the surfaces 22 and 56 of the belt body.

Figure 5:
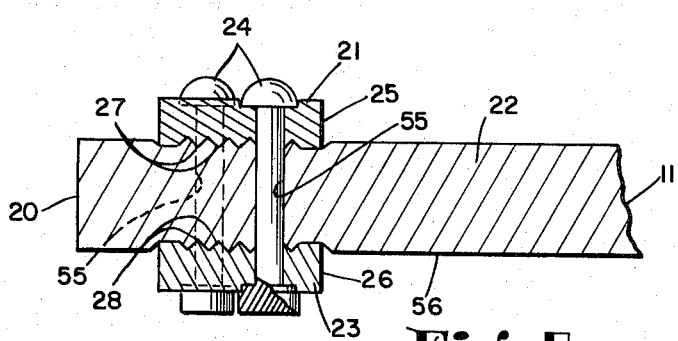
FIG. 5 is a fragmentary section view, taken substantially on the line 5—5 of FIG. 4 and drawn to an enlarged scale.
Figure 6:
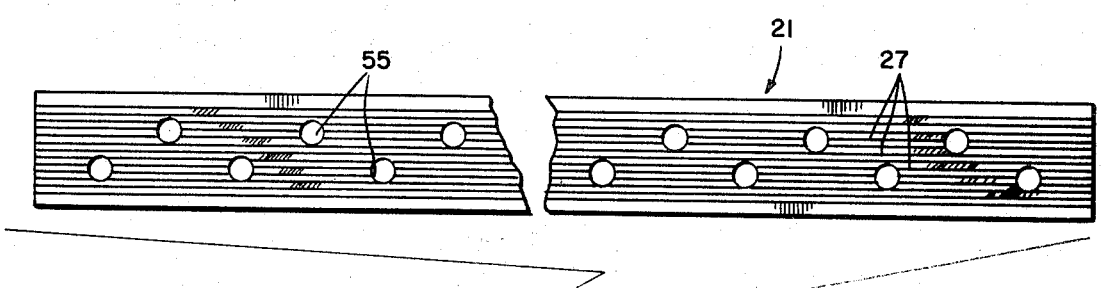
FIG. 6 is a broken bottom plan view of a splice constructed in according with the present invention.

As is most clearly to be seen in FIGS. 5 and 6, that surface of the plate 21 which bears upon the belt body 11 is formed with serrations 27 and that surface of the plate 26 which bears upon the belt body is formed with a similar series of serrations 28. Preferably and as shown, the serrations 27 and 28 may constitute relatively sharp-edged ribs or ridges extending longitudinally from end to end of their respective plates; and they are so constructed and arranged that, when the rivets 24 are set, both series of serrations will bite into the material of the belt body to assist in holding the plates against any movement longitudinally relative to the belt body.

The extremity of the belt end may preferably be formed with a plurality of semicylindrical notches 29 for a purpose which will appear.

The opposite end region 30 of the belt is similarly provided with a pair of splice plates 31 and 32, identical in all essential respects with the plates 21 and 23 and secured to the belt end in the same way be means of rivets 33. Thus, the plate 31 provides a proximally-facing surface 34 and the plate 32 provides a proximally-facing surface 35 equivalent in all respects to the surfaces 25 and 26 of the plates 21 and 23.

The extremity of the belt end 30 is formed with a plurality of notches 36 equivalent to, and mating with, the notches 29 in the belt end 20. The surfaces of the plates 31 and 32 which engage the belt end 30 are provided with serrations equivalent to the serrations 27 and 28.

An outer splice block 37 is formed in one surface to define an elongated cavity 38 bounded, in the direction of its length, by mutually-facing, substantially parallel walls 39 and 40. The cavity 38 is designed and constructed to receive the splice plates 21 and 31 with their proximally-facing surfaces 25 and 34, respectively, bearing against the cavity walls 39 and 40. An inner splice block 41 is formed in one surface to define an elongated cavity 42 bounded, in the direction of its length, by mutually-facing, substantially parallel walls 43 and 44. The cavity 42 is designed and constructed to receive the splice plates 23 and 32 with their proximally-facing surfaces 26 and 35, respectively, bearing against the cavity walls 43 and 44.

Primarily for weight reduction, that surface of the splice block 37 which is opposite the cavity 38 is formed with a plurality of recesses 45 disposed between lands 46 and, as shown, each such land is formed with a bore 47. Similarly, that surface of the splice block 41 remote from the cavity 42 is provided with recesses 48 between lands 49 which are formed with tapped bores 50.

When the belt body ends 20 and 30 are drawn together, the notches 29 and 36 register to define openings coaxial with the bores 47 and the tapped bores 50 so that the shanks of headed screws 51 may be passed through the bores 47 and the openings defined by the notches to be threadedly received in the tapped bores 50, the blocks 37 and 41 having been brought into association with the belt ends to enter the splice plates in the block cavities. Now, when the screws 51 are tightened down, the blocks 37 and 41 will be clampingly engaged with the belt body so that the splice plates will be retained in the block cavities affirmatively to prevent separation of the belt body ends.

Conventionally, the stiffener block assemblies 12 are made of wood, though sometimes metal stiffener blocks are used. Preferably, however, the splice blocks 37 and 41 will be made of light metal such as, for instance, a magnesium alloy, preferably having a relatively low specific gravity so that the mass of the splice assembly does not significantly exceed the mass of a stiffener block assembly.

Preferably, the blocks 37 and 41 will be formed to provide inclined end surfaces 52 and 53 equivalent in location and inclination to the surfaces 17 and 18, and will be provided with friction pads 54 equivalent to the pads 19, so that the splice block assembly will participate in the power-transmission function just as does each stiffener block assembly.

It will be apparent that each splice place 21, 23, 31 and 32 may be formed from conventional bar stock, the serrations being formed by a cold forging operation and the performations 55 for receiving the rivets 24 and 33 being formed by a drilling operation.

What is claimed is:
1. The combination with a belt body of means for securing together the ends of said body comprising a plate secured to each surface of said body adjacent each end of said body and extending transversely thereof, each of said plates presenting, in its proximal region, a proximally-facing surface which is generally transverse relative to said body, a first member engaging said proximally-facing surfaces of both plates on one surface of said body, a second member engaging said proximally-facing surfaces of both plates on the other surface of said body, and means engaging both of said members to clamp the same in place relative to said body and to said plates.

2. The combination of claim 1 in which that surface of each of said plates which abuts said body is roughened.

3. The combination of claim 1 in which that surface of each of said plates which abuts said body is formed with a plurality of serrations extending generally transversely relative to said belt body.

4. The combination of claim 1 in which said last-named means comprises a plurality of headed screws penetrating one of said members and threadedly engaging the other of said members.

5. The combination of claim 1 in which each of said plates is substantially rectangular in transverse section and each of said proximally-facing surfaces lies substantially in a plane perpendicular to said belt body.

6. The combination of claim 5 in which each of said members is formed, in its surface presented toward said belt body, with a cavity defining a pair of mutually-facing, substantially parallel walls, one wall of each cavity engaging a proximally-facing surface of one of said plates.

References Cited

UNITED STATES PATENTS

| | | | |
|---|---|---|---|
| 1,671,048 | 5/1928 | Reeves | 74—258 X |
| 2,070,382 | 2/1937 | Swift, Jr. | 74—236 X |
| 2,406,253 | 8/1948 | Reeves | 74—236 |
| 2,647,410 | 8/1953 | Reeves | 74—236 |
| 2,775,902 | 1/1957 | Rush | 74—234 |

FOREIGN PATENTS

| | | | |
|---|---|---|---|
| 268,627 | 5/1950 | Switzerland | 74—234 |

LEONARD H. GERIN, Primary Examiner

U.S. Cl. X.R.

74—258